United States Patent

D'Alterio et al.

[11] Patent Number: 5,960,705
[45] Date of Patent: Oct. 5, 1999

[54] APPARATUS AND METHOD FOR MOLDING FOOD PARTICLES

[75] Inventors: Joseph C. D'Alterio, Glen Cove; Paul W. Garbo, Freeport, both of N.Y.

[73] Assignee: SBJR Restaurants Inc., River Vale, N.J.

[21] Appl. No.: 09/176,365

[22] Filed: Oct. 21, 1998

[51] Int. Cl.[6] .............................. A23L 1/00; A47J 37/00; A22C 7/00

[52] U.S. Cl. ................. 99/349; 99/353; 99/373; 99/439; 425/394; 426/512; 426/523

[58] Field of Search .............................. 99/353, 349, 373, 99/377, 439; 100/317, 318, 244; 425/394, 398; 426/512, 523

[56] References Cited

U.S. PATENT DOCUMENTS

| | | |
|---|---|---|
| 3,940,217 | 2/1976 | McCarthy et al. ..................... 425/98 |
| 4,005,967 | 2/1977 | Ayres et al. ........................ 425/394 X |
| 5,074,778 | 12/1991 | Betts, Jr. et al. ..................... 425/394 |
| 5,376,395 | 12/1994 | Pels ..................................... 99/349 X |

*Primary Examiner*—Reginald L. Alexander
*Attorney, Agent, or Firm*—Paul W. Garbo

[57] ABSTRACT

A simple apparatus for molding and baking food particles into edible unified products comprises a heated stationary ring, a heated bottom plate, fitted in the ring and movable up and down therein, and a heated top plate that can be alternately brought down on, and lifted off, the ring. By placing a measured quantity of food particles on the bottom plate and bringing the top plate down in pressing contact with the ring, the food particles are compressed for a selected baking period. The top plate is then raised away from the ring, the bottom plate is pushed up so that its top face is flush with, or above, the top of the ring, and the resulting unified product is readily removed from the bottom plate.

18 Claims, 1 Drawing Sheet

APPARATUS AND METHOD FOR MOLDING FOOD PARTICLES

BACKGROUND OF THE INVENTION

This invention relates to an apparatus and method of molding food particles into edible coherent products. More particularly, the invention involves compressing and baking food particles to yield shaped products such as pie shells.

Illustrative of an edible product composed of pieces of food bonded together is the pasta-based product of U.S. Pat. No. 5,411,752 to Taylor et al. The patent discloses the formation of discrete pieces of cooked pasta with a binding composition into a desired shape. The pasta-based product is proposed as the base or shell of a pizza and as such may be garnished with tomato sauce, cheese, mushrooms, etc. U.S. Pat. No. 4,693,900 to Molinari also describes a shaped pasta product formed of cooked pasta. Zukerman discloses in U.S. Pat. Nos. 3,711,295; 3,961,087 and 5,137,745 shaped food products composed of rice and other cereal grains.

The prior art, however, fails to teach a simple apparatus and method for forming shaped products composed of food particles.

Accordingly, a principal object of the invention is to provide an apparatus and method for compacting and heating food particles into edible unified shapes.

Another important object is to provide an apparatus and method suitable for the commercial production of shaped products composed of coherent food particles.

A further object is to provide apparatus that can be automated with minimum mechanical movements.

These and other features and advantages of the invention will be apparent from the description which follows.

SUMMARY OF THE INVENTION

In accordance with this invention, an apparatus for molding and heating food particles into a unified shaped product comprises a heated stationary ring, a heated top plate that can be alternately brought down on, and lifted off, the ring, and a heated bottom plate fitted in the ring and movable up and down therein. The ring is a very short cylinder in which the bottom plate moves like a reciprocating piston.

When the top face of the bottom plate is below the top face of the ring, a shallow pan or basin is in effect formed. A desired amount of food particles deposited on the bottom plate can be compressed and baked by bringing the top plate down on the ring. At the end of the baking period, the top plate is moved up away from the ring and the bottom plate is moved up so that its top face is at least flush with the top surface of the ring. Thereupon, the thus formed, coherent food disk can be simply pushed off the bottom plate.

The bottom plate is pulled down so that its top face is again below the top face of the ring to provide the shallow pan into which another measured amount of food particles is dropped to start again the cycle of compressing and cooking the food particles into a unified edible disk.

The top or molding face of the bottom plate is preferably smooth and flat to facilitate the removal of the coherent food product formed thereon simply by pushing the product horizontally. Of course, the top face may have slight curvature and/or a slightly indented pattern that will not interfere with the removal of the shaped food product therefrom by a horizontal push.

The bottom or molding face of the top plate can be flat, concave or convex. A convex face, e.g., one with a protrusion having a periphery smaller than the periphery of the molding face of the bottom plate, will form a unified food product shaped like a shallow pan with a turned-up lip. A top plate with a concave molding face will yield a product shaped like a meringue pie. In short, the molding face of the top plate can have many contours.

While the ring of the apparatus of the invention is circular in its simplest embodiment, it may be oval, square, oblong or other desired shape, e.g., heart shape. Of course, whatever shape is selected for the ring must also be the shape of the bottom plate which must move up and down within the ring with a piston-like motion.

While the heating of the top and bottom plates and ring can be achieved with steam or other heating fluid, or even with gas burners, electrical heaters are preferred for structural simplicity and ease of temperature control. While electrical heating elements can be attached to the exterior portions of the top and bottom plates and the ring, they are frequently embedded in the plates and ring. Aluminum is the preferred metal, but other metals such as stainless steel may be substitutes. When the top and bottom plates and the ring are formed of thick aluminum stock, it may be drilled to provide cavities into which electrical heating elements are fitted. Another way of embedding the heating elements is to mill grooves or cavities in the exterior portions of the plates and ring so that the heating elements can be laid therein. Regardless of how heating is effected, insulation should cover all exterior portions of both plates and ring to reduce heat losses and prevent burns to workers.

Of the many types of food particles that can be molded into coherent shaped products, the aforementioned U.S. Patents specify some common examples. To begin with, the term "particles" as used herein is intended to embrace discrete matter ranging in size from about a grain of rice to a pasta shape such as ziti, preferably not exceeding about 3 inches in length. Chopped meat, fish, vegetables, etc., together with binding agents such as eggs and A-edible gums are additional examples. Some foods tend to stick to the molding faces. A Teflon coating on the molding faces is often adequate to overcome the problem. Chromium plating is another way of eliminating the stickiness of some foods to the molding faces.

Basically, the vertical movements of the top and bottom plates can be effected manually. However, the simplicity of the movements makes it obvious that various known mechanical means can be used to eliminate manual labor. For example, pneumatic pistons are simple and quick-acting means for achieving the required movements of both molding plates. Rack and pinion or a motor-driven screw can also produce the piston-like movements of both molding plates. Through the use of mechanical means actuated electrically, pneumatically, hydraulically or magnetically, the apparatus of the invention is easily automated by a timing device that causes the sequential movements of the top and bottom molding plates and even means for supplying a measured amount of food particles on the bottom plate as well as means for displacing the molded product therefrom. In short, the apparatus of the invention is ideally suitable for large-scale production of molded food products.

BRIEF DESCRIPTION OF THE DRAWINGS

For further clarification of the invention, the following description will refer to the appended drawings of which.

DESCRIPTION OF A PREFERRED EMBODIMENT

Figure 1:
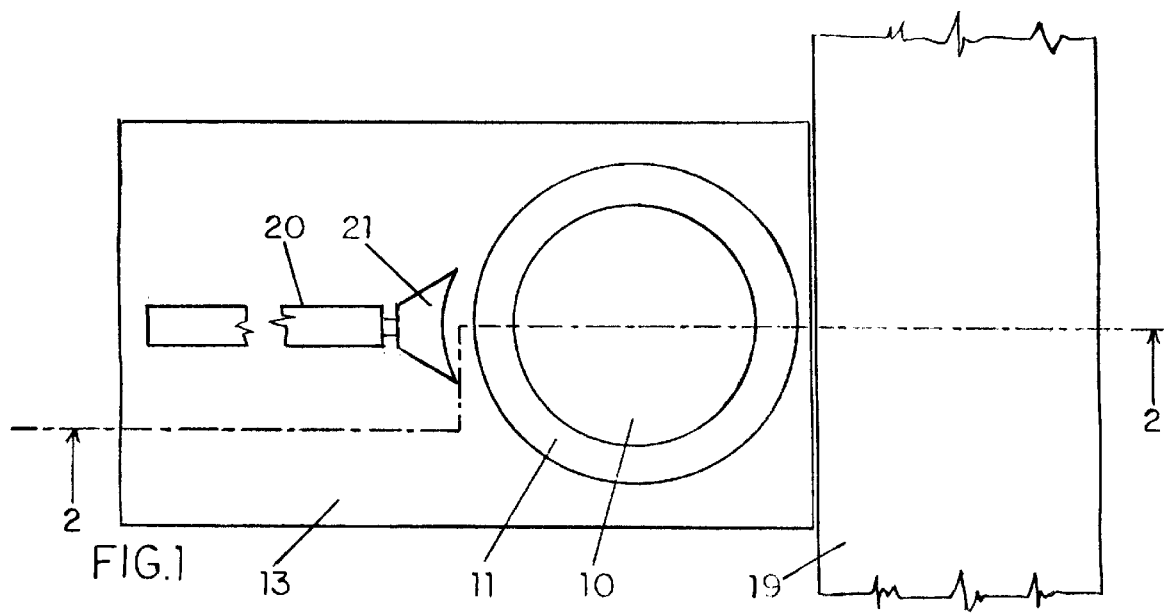
FIG. 1 is a diagrammatic plan view of a simple embodiment of the apparatus of the invention, omitting the top molding plate.
Figure 2:
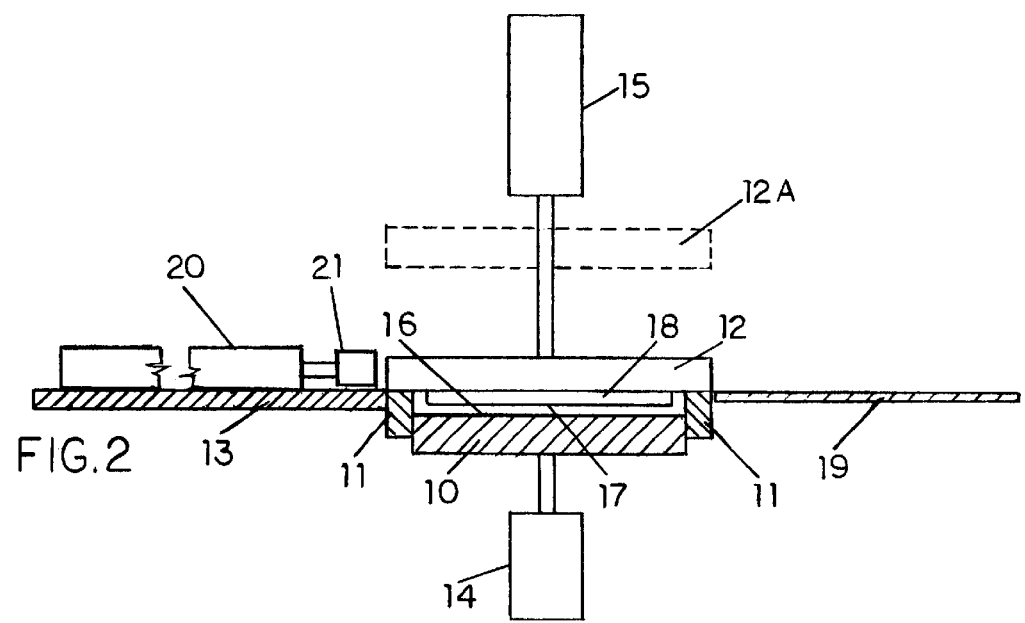
FIG. 2 is a diagrammatic sectional view taken along the line 2—2 of FIG. 1, including the entire top plate.

FIG. 1 and FIG. 2 show the basic components of the apparatus of the invention, namely, bottom molding plate 10 positioned in ring 11 and top molding plate 12 positioned on ring 11. A table 13 is used to hold ring 11 in a fixed position. Molding plates 10,12 are connected to the piston rods of pneumatic cylinders 14,15, respectively, which can move plates 10,12 up and down. While bottom plate 10 has a flat molding face 16, top plate 12 has a molding face 17 with protrusion 18 that extends into the molding space when top plate 10 is seated on ring 11. The periphery of protrusion 18 is made smaller than the inside periphery of ring 11 so that the molded food product will have the form of a shallow pan with a turned-up edge. As previously explained, both plates 10,12 and ring 11 are preferably electrically heated by elements (not shown) embedded in, or attached to, the massive aluminum which usually forms plates 10,12 and ring 11. It is obvious that cylinder 14 would be anchored to the floor and cylinder 15 would be suspended from the ceiling or other overhead rigid structure.

The description of the molding operation will refer to the sequential movement of plates 10,12 by cylinders 14,15 but the movements can be performed manually or by other known mechanisms. With bottom plate 10 positioned in ring 11 as shown in FIG. 2 to provide a shallow basin and with top plate 12 raised well above ring 11 (like phantom showing of top plate 12A), a measured amount of food particles is dropped on bottom plate 10. Thereupon, top plate 12 is brought down on ring 11 by cylinder 15 and pressed thereagainst for the desired baking period at the end of which top plate 12 is raised well above ring 10 by cylinder 15. Bottom plate 10 is pushed up by cylinder 14 to drive the molded food product out of ring 11. With face 16 of plate 10 flush with, or above, the top of ring 11, the molded food product is easily pushed off plate 10 and onto adjacent conveyor belt 19. Pneumatic cylinder 20 with its piston and arcked pusher 21 mounted on table 13 is illustrative of simple automatic means for displacing the molded food product from bottom plate 10.

Having completed the formation and discharge of a molded food product, the apparatus is ready to repeat the operation. Bottom plate 10 is retracted by cylinder 14 in ring 11 to form the cavity or basin into which a measured quantity of food particles is again deposited and top plate 12 is brought down by cylinder 15 on ring 11, thus starting the next cycle of sequential plate movements to yield another unit of molded food product.

It is well to note that the disposition of bottom plate 10 within ring 11 to provide a cavity or basin for the reception of food particles and compaction thereof followed by the discharge of the molded food product requires movement of bottom plate 10 and ring 11 relative to one another. The preferred way of achieving such relative movement has been amply described; that is, bottom plate 10 is moved up and down in stationary ring 11. However, the relative movement can also be effected by making bottom plate 10 stationary and moving ring 11 up and down around plate 10. It is obviously far more cumbersome to have ring 11 reciprocate than bottom plate 10.

Lifting top plate 12 well above ring 11 as shown by phantom top plate 12A is desirable to provide space for means to move toward the center of bottom plate 10 and drop a measured amount of food particles thereon for the molding of the shaped product. For example, a feed hopper could be placed over cylinder 20 on table 13 so that a mass of food particles therein can be passed in metered amounts by delivery means that move into the zone between top plate 12A and bottom plate 10, and after delivering the food particles on plate 10, retract from that zone so that top plate 12 can be brought down on ring 11 without any obstruction by the delivery means.

Food particles containing moisture and other volatile components will generate a gas pressure within the mold formed by plates 10,12 and ring 11. Especially, during the start of the baking period, the pressure on top plate 12 to keep a tight seal where plate 12 is seated on ring 11 should be diminished for a few seconds to allow the volatiles to leak out. Food particles with a high content of volatiles may require several such brief ventings of volatiles to prevent the build-up of excessive gas pressure within the mold.

Many variations and modifications of the invention will be apparent to those skilled in the art without departing from the spirit or scope of the invention. For example, either or both of plates 10,12 may have a molding face formed of one metal backed up by a different metal. Also, the molding face of top plate 12 may be partly concave and partly convex. For example, if the border portion is concave and the core portion is convex, the molded food product will, in its upper portion, be doughnut-like in shape. Accordingly, only such limitations should be imposed on the invention as are set forth in the appended claims.

What is claimed is:

1. An apparatus for molding and heating food particles into a coherent, edible product, which comprises a heated ring, a heated bottom plate slidably fitted in said ring so that the top face of said bottom plate can be alternately positioned below the top of said ring and positioned flush with, or above, said top of said ring, and a heated top plate larger than said bottom plate which can be alternately pressed against said top of said ring and lifted therefrom.

2. The apparatus of claim 1 wherein the top plate, the bottom plate and the ring are made of aluminum and each of which has electrical heating elements attached thereto.

3. The apparatus of claim 2 wherein the bottom face of the top plate is partially convex.

4. The apparatus of claim 2 wherein the bottom face of the top plate is partially concave.

5. An apparatus for molding and heating food particles into a unified, edible product, which comprises a heated, reciprocative bottom plate, a heated fixed ring surrounding said bottom plate, and a heated, reciprocative top plate larger than said bottom plate which can alternately be brought down on said ring and raised away from said ring, said bottom plate being reciprocative between a position where its top face is flush with, or above, the top of said ring and a lower position where said top face is still surrounded by said ring.

6. The apparatus of claim 5 wherein the top plate, the bottom plate and the ring are made of aluminum and each of which has electrical elements attached thereto.

7. The apparatus of claim 6 wherein the bottom face of the top plate is partially convex.

8. The apparatus of claim 6 wherein the bottom face of the top plate is partially concave.

9. The apparatus of claim 6 wherein the top plate and the bottom plate are individually attached to pneumatic piston rods that effect the reciprocation thereof.

10. The apparatus of claim 5 wherein the pneumatic piston rods are sequentially activated by a timing device.

11. The apparatus of claim 6 wherein the bottom plate and the ring are circular and the bottom face of the top plate has a circular protrusion having a diameter slightly smaller than the inside diameter of said ring so as to form a unified product shaped like a pizza shell with a turned-up rim.

12. The apparatus of claim 11 wherein the top plate and the bottom plate are individually attached to pneumatic piston rods that effect the reciprocation thereof.

13. The apparatus of claim 12 wherein the pneumatic piston rods are sequentially activated by a timing device.

14. A method of molding and baking food particles into a shaped edible product which comprises the sequential steps of depositing a measured quantity of said food particles on a heated bottom plate while the top face thereof is below the top end of a heated fixed ring surrounding said bottom plate, bringing a larger, heated top plate down against said top end of said ring, raising said top plate away from said ring after a selected baking period, pushing said bottom plate upward in said ring so that said top face of said bottom plate is flush with, or above, said top end of said ring, and displacing the resulting shaped edible product fom said bottom plate.

15. The method of claim 14 wherein the bottom plate and the ring are circular, the food particles are pieces of cooked pasta admixed with an edible binding agent and the bottom face of the top plate has a circular protrusion with a diameter slightly less than the diameter of said circular bottom plate so as to form a shaped product similar to a pizza shell with a raised edge.

16. The method of claim 14 wherein the bottom plate and the ring are circular, the food particles are pieces of cooked pasta admixed with ground meat, and the bottom face of the top plate is concave so as to form a shaped product similar to a hamburger.

17. The method of claim 14 wherein the food particles are processed, sticky rice admixed with ground meat, and the bottom face of the top plate is concave.

18. The method of claim 15 wherein the pieces of cooked pasta have a length not exceeding about 3 inches.

* * * * *